T. E. McNEILL.
Apparatus for Feeding and Returning Water of Condensation to Steam-Boilers.
No. 138,673. Patented May 6, 1873.
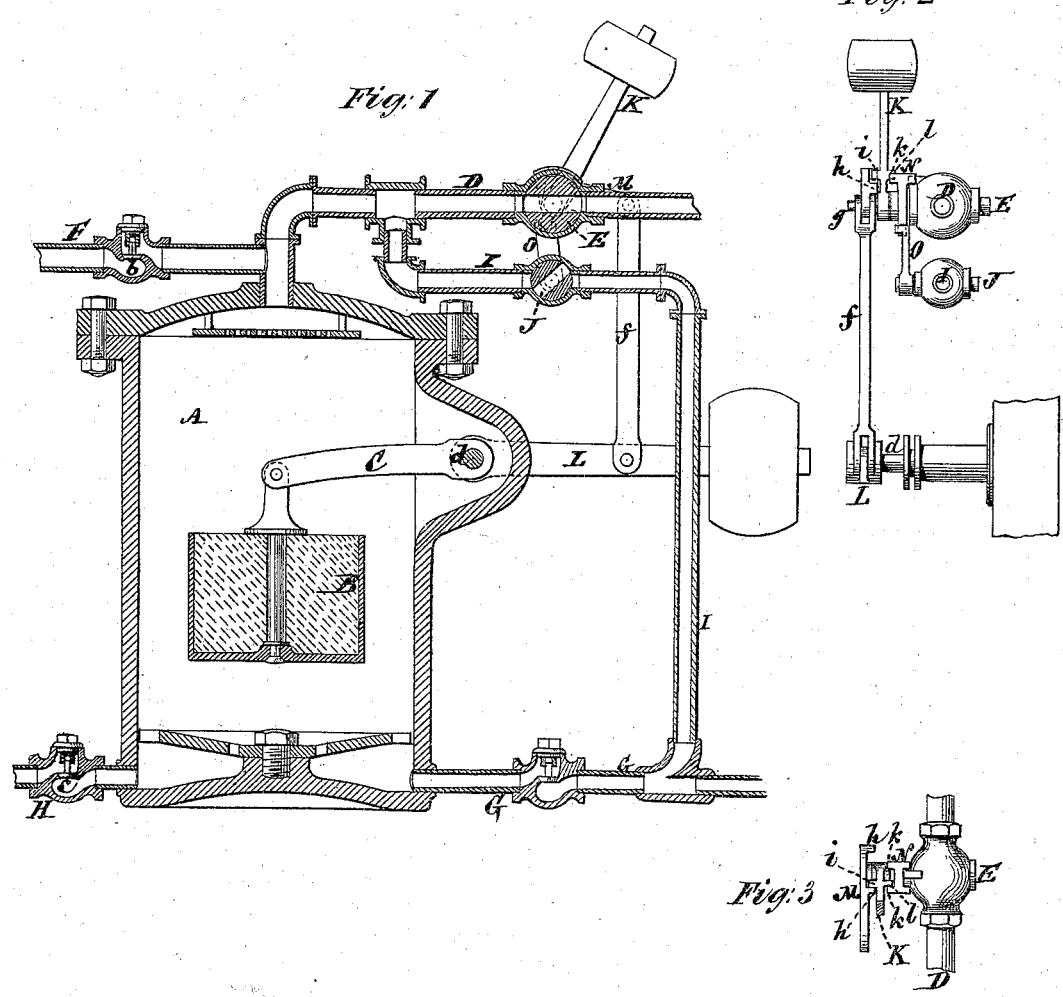

UNITED STATES PATENT OFFICE.

THOMAS E. McNEILL, OF NEW YORK, N. Y.

IMPROVEMENT IN APPARATUS FOR FEEDING AND RETURNING WATER OF CONDENSATION TO STEAM-BOILERS.

Specification forming part of Letters Patent No. 138,673, dated May 6, 1873; application filed February 17, 1873.

*To all whom it may concern:*

Be it known that I, THOMAS E. MCNEILL, of the city, county, and State of New York, have invented an Improvement in Apparatus for Feeding or Returning Water of Condensation to Steam-Boilers, of which the following is a specification:

This invention is applicable either as a boiler-feeder for returning the water of condensation in a steam heating apparatus, or elsewhere, back to the boiler, or for feeding a fresh or independent supply of water to a steam-boiler irrespective of the purpose to which the latter is applied. To these ends the invention consists in certain novel combinations of pipes or passages, and valves, with a cylinder containing a counterbalanced float, and trip mechanism for operating the valves, whereby an automatic and most perfect action is obtained. The invention also consists in a certain connection of an exhaust or waste-steam pipe, with the water-inlet of the apparatus, whereby said steam is not only condensed in its passage to the apparatus, but also caused to assist the flow of the water being supplied.

In the accompanying drawing, which forms part of this specification, Figure I represents a sectional elevation of an apparatus constructed in accordance with my invention; Fig. 2, an end elevation of certain mechanism used for operating the valves; and Fig. 3 a plan thereof, in part.

Similar letters of reference indicate corresponding parts.

A is the cylinder or close vessel in which the water to be fed to the boiler is collected, and from which it is discharged automatically by the rise and fall of a partially-submerged float, B, carried by a lever, C, that serves as the prime mover of the valves, or certain of them, as in the case of certain steam-traps and apparatus for feeding or supplying water to steam-boilers. D is a live-steam pipe connecting the steam-space of the boiler with the upper part of the cylinder A, subject to the control of a cock or valve, E. F and G are pipes for conveying the water of condensation, or water from any other source, to the cylinder A, the one of said pipes forming its connection above and the other below. Either or both of these pipes may be used according to circumstances, and each is provided with a check-valve, *b*, closing against the return of the incoming water. H is the water-discharge pipe from the apparatus to the boiler. Said pipe should also be provided with a check-valve, *c*, opening outward. I is a waste or steam-exhaust pipe, communicating with the upper portion of the cylinder A, between it and the valve E, and furnished with a cock or valve, J. This pipe is arranged to connect below with the water-inlet pipe G by a bent elbow or passage, so as to discharge the exhaust steam into and against the water in the pipe G, in line, or nearly so, with the flow of the water, whereby said steam is not only condensed, thereby imparting its heat to the incoming water, but whereby, also, it is first caused to convey an impulse to the water in the direction in which it runs, thereby assisting the supply or passage of the water. The cocks E and J are both subject to the control of the float B, the cock J being closed when the valve E is open, and vice versa, or closing a little earlier than the valve E, to prevent loss of steam. These valves are connected to work in relation with each other, as described, by coupling attachments, substantially as hereinafter described, or their equivalents, subject to the tilting action of a weighted arm or lever, K, as the latter passes a perpendicular position, whereby said valves are operated quickly and with efficiency, and the action of the float B is restricted to the mere lifting of said lever K, to or a little beyond an upright position. On the fulcrum or shaft *d* of the lever C is a weighted arm or lever, L, which partly counterbalances the float B, and which, by a connection, *f*, and crank M, serves to alternate the position, as required, of the weighted arm or lever K, to opposite sides of its gravitating center or upright position. To this end, the crank M is fast to the spindle *g*, on which the valve E is fitted to turn loosely, and said crank provided with lips or studs *h h*, on opposite sides of its center, and the weighted lever K, that is loose on the spindle *g*, with a stud, *i*, arranged to occupy a free position between the lips *h h*. Furthermore, fast to the cock E, or sleeve projecting therefrom, and turning loosely on the spindle *g*, is a lever, N, having studs *k k* on its upper arm, and between which a stud, $l$, on the weighted lever K occupies a free position, while the lower arm of the lever N has an easy fit or connection with a crank fast on the spindle of the cock J.

The operation is as follows: Water entering the cylinder A by the pipes F and G, or either of them, or spent steam entering by said inlets and condensing within the cylinder, the float B is raised, and the lever L and crank M lowered accordingly, which causes the left-hand lip $h$ of said crank to bear on the stud $l$ of the weighted lever K, and move the latter from its left-hand throw or drop to or a little beyond a vertical position, when said lever immediately falls by the action of gravity to the position represented for it in Fig. 1. This falling to the right of the lever K causes its stud $i$ to bear on the one stud $k$ of the crank N, and thereby to turn and open the valve E, and simultaneously, or a little before, by means of the crank O, to close the valve J. Steam then is admitted by the pipe D to the top of the water in the cylinder A, the check-valves $b$ closing, and an equilibrium of pressure being established between the cylinder A and the boiler, the water is discharged by gravity from said cylinder by the pipe H into the boiler, the float B falling till the lever L is sufficiently raised to bring the weighted lever K slightly to the left of an upright position by the action of the right-hand lip $h$ of the crank M on the stud $i$. The weighted lever K then falls over to the left, causing its stud $l$ to bear on the other stud $k$ of the crank N, and thereby to reverse or close the valve E, and simultaneously, or thereabout, to open, by the crank O the valve J. This allows the steam in the cylinder A to escape, and to act upon and mingle with the water in the pipe G, and pass in a condensed state to the cylinder A, or, by omitting the connection of the exhaust-pipe I with the water-inlet pipe G, the spent steam, or such of it as is not condensed within the cylinder, may pass off to the atmosphere or to a condenser. The cylinder A being thus supplied again with water, the action of the apparatus is repeated as before.

Claims.

1. The combination of the steam-cock E, the exhaust-cock J, the pipes D I, in communication with the cylinder A above, the crank M, the weighted or tumbling-lever K, the lever N, the lips $h$, the studs $i\ l\ k\ k$, the crank O, the counterbalanced float B, the levers C L, the connection $f$, the cylinder A, the pipes F G, and the water-discharge pipe H, the whole being arranged for operation, substantially as specified.

2. The combination, with the water-inlet pipe G, of the pipe I, extended and constructed to discharge the exhaust steam in line, or nearly so, with the flow of water through the pipe G, the exhaust-cock J, the steam-cock E, the pipe D, the cylinder or vessel A, and the operating float B, essentially as shown and described.

THOMAS E. NcNEILL.

Witnesses:
MICHAEL RYAN,
FRED. HAYNES.